(12) United States Patent
Sisto et al.

(10) Patent No.: US 7,882,297 B2
(45) Date of Patent: Feb. 1, 2011

(54) SERIAL BUS HUB WITH LOW POWER DEVICES

(75) Inventors: John F. Sisto, Hauppauge, NY (US); Charles Forni, Setauket, NY (US); Neil A. Winchester, Dix Hills, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 65 days.

(21) Appl. No.: 12/389,538

(22) Filed: Feb. 20, 2009

(65) Prior Publication Data

US 2010/0217911 A1  Aug. 26, 2010

(51) Int. Cl.
*G06F 13/20* (2006.01)
(52) U.S. Cl. .................. 710/313; 710/306; 713/300
(58) Field of Classification Search .............. 710/313, 710/305–306; 713/300, 321–324, 330–340
See application file for complete search history.

(56) References Cited

U.S. PATENT DOCUMENTS

| | | | |
|---|---|---|---|
| 4,390,964 A | 6/1983 | Horky et al. |
| 5,541,985 A | 7/1996 | Ishii et al. |
| 5,630,081 A | 5/1997 | Rybicki et al. |
| 5,786,769 A | 7/1998 | Coteus et al. |
| 5,815,426 A | 9/1998 | Jigour et al. |
| 5,841,654 A | 11/1998 | Verissimo et al. |
| 5,848,298 A | 12/1998 | Steere, Jr. |
| 5,877,483 A | 3/1999 | Bilich et al. |
| 6,000,607 A | 12/1999 | Ohki et al. |
| 6,012,103 A | 1/2000 | Sartore et al. |
| 6,168,077 B1 | 1/2001 | Gray et al. |
| 6,184,652 B1 | 2/2001 | Yang |
| 6,230,277 B1 | 5/2001 | Nakaoka et al. |

(Continued)

FOREIGN PATENT DOCUMENTS

EP       0982663       3/2000

(Continued)

OTHER PUBLICATIONS

Compaq et al. "Universal Serial Bus Specification Revision 2.0" Apr. 27, 2000, p. 171-177.

(Continued)

*Primary Examiner*—Mark Rinehart
*Assistant Examiner*—Kim T Huynh
(74) *Attorney, Agent, or Firm*—Meyertons Hood Kivlin Kowert & Goetzel, P.C.; Jeffrey C. Hood; Joel L. Stevens

(57) ABSTRACT

Serial bus hub with one or more low power devices. The serial bus hub may include at least one upstream port for coupling to a host system. The serial bus hub may include one or more downstream ports for coupling to peripheral devices. The serial bus hub may include the low power devices which may have no functionality external to the serial bus hub. The presence of the low power devices may allow the serial bus hub to draw additional power from the host system and a substantial portion of the additional power may be usable by other devices. The serial bus hub may be configured to allow the host system and one or more peripheral devices coupled to the one or more downstream ports to communicate.

23 Claims, 3 Drawing Sheets

U.S. PATENT DOCUMENTS

| | | | |
|---|---|---|---|
| 6,308,239 | B1 | 10/2001 | Osakada et al. |
| 6,349,878 | B2 | 2/2002 | Imai |
| 6,405,362 | B1 | 6/2002 | Shih et al. |
| 6,438,638 | B1 | 8/2002 | Jones et al. |
| 6,460,106 | B1 | 10/2002 | Stufflebeam |
| 6,460,143 | B1 | 10/2002 | Howard et al. |
| 6,507,172 | B2 | 1/2003 | Sherman |
| 6,531,845 | B2 | 3/2003 | Kerai et al. |
| 6,532,512 | B1 | 3/2003 | Torii et al. |
| 6,541,879 | B1 | 4/2003 | Wright |
| 6,557,754 | B2 | 5/2003 | Gray et al. |
| 6,598,100 | B2 | 7/2003 | Shu et al. |
| 6,622,195 | B2 | 9/2003 | Osakada et al. |
| 6,654,841 | B2 | 11/2003 | Lin |
| 6,662,258 | B1 | 12/2003 | Lukanc et al. |
| 6,681,991 | B1 | 1/2004 | Li |
| 6,714,215 | B1 | 3/2004 | Flora et al. |
| 6,732,218 | B2 | 5/2004 | Overtoom et al. |
| 6,738,068 | B2 | 5/2004 | Cohen et al. |
| 6,798,173 | B2 | 9/2004 | Hsu |
| 6,804,740 | B1 | 10/2004 | Watts, Jr. |
| 6,910,627 | B1 | 6/2005 | Simpson-Young et al. |
| 6,928,562 | B2 | 8/2005 | Cohen et al. |
| 6,945,454 | B2 | 9/2005 | Tournemille et al. |
| 6,946,817 | B2 | 9/2005 | Fischer et al. |
| 6,990,549 | B2 | 1/2006 | Main et al. |
| 7,017,055 | B1 | 3/2006 | Ho |
| 7,024,569 | B1 * | 4/2006 | Wright et al. ............... 713/300 |
| 7,039,727 | B2 | 5/2006 | Camara et al. |
| 7,047,343 | B2 | 5/2006 | Shaw |
| 7,051,218 | B1 | 5/2006 | Gulick et al. |
| 7,069,347 | B1 | 6/2006 | Kolokowsky |
| 7,086,583 | B2 | 8/2006 | Wurzburg |
| 7,134,027 | B2 | 11/2006 | Calhoon |
| 7,149,888 | B1 | 12/2006 | Hart et al. |
| 7,170,259 | B2 | 1/2007 | Veselic |
| 7,194,638 | B1 | 3/2007 | Larky |
| 7,207,014 | B2 | 4/2007 | Velasco et al. |
| 7,210,619 | B2 | 5/2007 | Wurzburg |
| 7,219,240 | B2 | 5/2007 | O |
| 7,325,733 | B2 | 2/2008 | Wurzburg et al. |
| 7,340,627 | B1 | 3/2008 | Harvey |
| 7,346,728 | B1 | 3/2008 | Jackson |
| 7,516,413 | B2 | 4/2009 | Toh et al. |
| 7,518,343 | B2 | 4/2009 | Veselic |
| 2002/0155893 | A1 | 10/2002 | Swanberg et al. |
| 2003/0167345 | A1 | 9/2003 | Knight et al. |
| 2004/0027879 | A1 | 2/2004 | Chang |
| 2004/0078514 | A1 | 4/2004 | Kung et al. |
| 2004/0130505 | A1 | 7/2004 | Lee et al. |
| 2004/0221181 | A1 | 11/2004 | Yu |
| 2006/0181241 | A1 | 8/2006 | Veselic |
| 2006/0287007 | A1 | 12/2006 | Veselic et al. |
| 2007/0088967 | A1 | 4/2007 | Fu et al. |
| 2007/0139705 | A1 | 6/2007 | Ogiwara et al. |
| 2007/0143505 | A1 | 6/2007 | Terrell, II |
| 2009/0144469 | A1 * | 6/2009 | Brundridge et al. .......... 710/74 |

FOREIGN PATENT DOCUMENTS

| | | |
|---|---|---|
| GB | 2352540 | 1/2001 |
| JP | 07-334633 | 12/1995 |
| JP | 693723 A1 | 1/1996 |
| JP | 408050643 A | 2/1996 |
| JP | 2000035837 | 2/2000 |
| JP | 2000242377 | 9/2000 |
| JP | 2001043178 | 2/2001 |
| JP | 2003140784 | 5/2003 |
| JP | 2003280775 | 10/2003 |
| KR | 1020040008365 | 1/2004 |
| KR | 100490068 | 5/2005 |

OTHER PUBLICATIONS

Monks, Morgan, Mark R. Bohm, U.S. Appl. No. 11/465,189, "System and Method for Fapidly Charging a USB Device", Aug. 17, 2006.

"LM3658 Dual Source USB/AC Li chemistry Charger IC for Portable Applications"; Datasheet; May 2005; 14 pages; National Instruments Corporation; Austin, TX.

Terry Remple, Megan Hayes, and Dave Wilson; "CEA-936-A USB Carkit Specification"; Aug. 11, 2005; 97 pages; Consumer Electronics Association (CEA) R6 Mobile Electronics Committee.

Carlson, Brian; "SmartReflex Power and Performance Management Technologies", Texas Instruments, 8 pages, 2005.

"USB MulitSwitch Hub"; SMSC Datasheet; Jun. 17, 2006; 57 pages; Standard Microsystems Corp., Hauppauge, NY.

"Programmable Multi-Host Device Sharing USB Hub"; IBM Research Disclosure; Feb. 1999; vol. 418, No. 92; Mason Publications, Hampshire, GB.

Universal Serial Bus Specification Revision 2.0, 6 pages; Apr. 27, 2000.

Universal Serial Bus Specification Revision 2.0 Compaq et al., Apr. 27, 2000, pp. 21,32,33,60,65,66,80,156.

"PCI Bus Power Management Interface Specification" Revision 1.1 PCI Special Interest Group; Dec. 18, 1998; pp. 55-59.

"Power Saving of Using USB Selective Suspend Support Whitepaper" Version 0.6 Kris Fleming; May 20, 2003; pp. 1-7.

"Advanced Configuration and Power Interface Specification," Revision 2.0c, Aug. 25, 2003; pp. 1-200.

"Advanced Configuration and Power Interface Specification," Revision 2.0c, Aug. 25, 2003; pp. 201-518.

"The Laptop Computer May Be Unable to Enter the C3 Processor Power-Saving State"; printed from the internet: http://support.microsoft.com/default.aspx?scid=kbjen-us;297045; (Article publication date is unknown).

"Wireless Handsets: TWL4030"; Texas Instruments; Mar. 20, 2007; 2 pages; online at <http://focus.ti.com/general/docs/wtbu/wtbugencontent.tsp?templateId=6123&contentId=4634&DCMP=WTBU&HQS=ProductBulletin+OT+twl4030>.

Prior Art Statement (2 pages); Feb. 2009.

* cited by examiner

SERIAL BUS HUB WITH LOW POWER DEVICES

FIELD OF THE INVENTION

The present invention relates to the field of serial bus hubs, and more particularly to a serial bus hub including one or more low power devices.

DESCRIPTION OF THE RELATED ART

In recent years, serial busses, especially universal serial busses (USBs) have become increasingly popular. For example, almost every type of peripheral device uses serial communication with a host. Accordingly, serial bus hubs have also become popular. Serial bus hubs are now included in a variety of devices, such as monitors, printers, docking stations, etc. However, passive serial bus hubs, which receive their power from the host, are often hamstrung by specified power limitations.

Some prior art systems overcome power limitations by simply drawing more power than is permitted; however, such solutions are typically not permitted by various specifications (e.g., the USB specification) and can cause a variety of problems. For example, some battery powered devices may experience reduced battery lifetime using such solutions.

Accordingly, improvements in serial bus hubs are desired.

SUMMARY OF THE INVENTION

Various embodiments are presented of a serial bus hub with one or more low power devices.

A serial bus hub (e.g., a universal serial bus (USB) hub) may include an upstream port (e.g., at least one upstream port). The upstream port may be configured to couple to a host system.

The serial bus hub may include one or more downstream ports coupled to the upstream port. The one or more downstream ports may each be configured to couple to a peripheral device.

The serial bus hub may include one or more low power devices coupled to the upstream port. The one or more low power devices may have no functionality external to the serial bus hub and the presence of the one or more low power devices may allow the serial bus hub to draw additional power (e.g., 100 mA for each low power device) from the host system. A substantial portion of the additional power from the host system may be usable by other devices. In other words, in one embodiment, the one or more low power devices may be present substantially only for the purpose of allowing the serial bus hub to draw additional power, which may then be used by other devices.

The serial bus hub may be configured to allow the host system and one or more peripheral devices coupled to the one or more downstream ports to communicate.

In some embodiments, the serial bus hub may include one or more non-removable devices coupled to the upstream port. The one or more non-removable devices may draw at least a portion of the additional power from the host system. The one or more non-removable devices may include a network communication controller (e.g., an Ethernet controller) for communicating over a network (e.g., an Ethernet network). Thus, the serial bus hub may include a network port coupled to the network communication controller for coupling to the network. The number of the one or more low power devices is based on the power required by the one or more non-removable devices.

The serial bus may be included in a docking station, a printer, and/or another type of device. The serial bus hub may be a passive serial bus hub which receives power from the host system.

The method may include enumerating the one or more low power devices in the serial bus hub with a host system. Accordingly, power may be received from the host system based on the one or more low power devices. At least a portion of the power may be provided to one or more non-removable devices in the serial bus hub instead of the one or more low power devices.

One or more peripheral devices may also be enumerated with the host system. The peripheral devices may be coupled to corresponding downstream ports of the serial bus hub with the host system. Accordingly, communication between the one or more peripheral devices and the host system may be performed. A second portion of the power above may be provided to the one or more peripheral devices.

In various embodiments, the method described above may be implemented as program instructions stored on a memory medium (e.g., firmware of the serial bus hub), in a programmable hardware element, such as a field programmable gate array, and/or an application specific integrated circuit (ASIC), as desired.

BRIEF DESCRIPTION OF THE DRAWINGS

A better understanding of the present invention can be obtained when the following detailed description of the preferred embodiment is considered in conjunction with the following drawings, in which.

Figure 1:
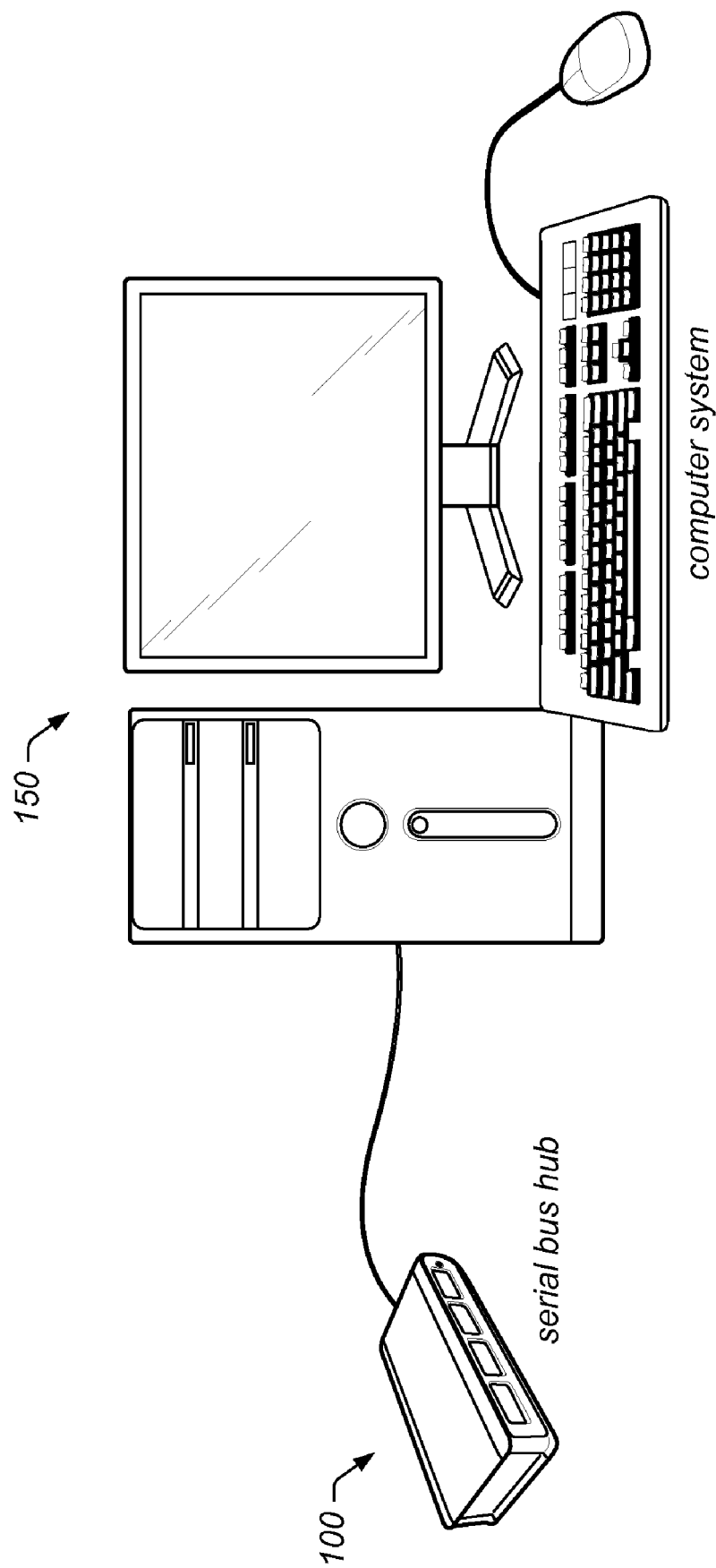
FIG. 1 illustrates an exemplary serial bus hub coupled to a computer system according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, flash memory, etc. The memory medium may comprise other types of memory as well, or combinations thereof. In addition, the memory medium may be located in a first device in which the programs are executed, or may be located in a second different device which connects to the first device over a network, such as the Internet. In the latter instance, the second device may provide program instructions or data to the first device for execution or reference. The term "memory medium" may include two or more memory mediums which may reside in different locations, e.g., in different computers that are connected over a network.

Software Program—the term "program" or "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIGS. 1—Computer System Coupled to Serial Bus Hub

FIG. 1 illustrates one embodiment of a serial bus hub 100 coupled to a host system 150. The host system 150 may be any of various host devices; more specifically, the host system 150 may be a computer system and/or other types of host devices operable to perform various embodiments described herein. Alternatively, or additionally, the host system 150 may be a serial bus device, e.g., a USB device. For example, in one embodiment, the host system 150 may be a USB on-the-go (OTG) device which may be operable to act as a host and a device, e.g., depending on the situation. Thus, according to various embodiments the host system 150 may be any of various appropriate devices.

The exemplary host system 150 of FIG. 1 may include a display device operable to display video or other signals. Additionally, the computer system 150 may include a keyboard and/or mouse, which may be serial devices. The keyboard and/or mouse may couple to the host system 150 via a variety of ways, e.g., directly to the host system 150 or via the serial bus hub 100, among other methods. Additionally, the host system 150 may include at least one memory medium on which one or more computer programs or software components may be stored. For example, the memory medium may store operating system software, as well as other software for operation of the host system 150. Various embodiments further include receiving or storing instructions and/or data implemented in accordance with the foregoing description upon a carrier medium.

In some embodiments, the serial bus hub 100 may be a Universal Serial Bus (USB) hub. In one embodiment, the serial bus hub 100 may be a passively powered hub, e.g., a USB Bus-Powered Hub. The serial bus hub 100 may include a non-removable device. For example, the serial bus hub may include an Ethernet controller, a display, an audio playback device, and/or any type of appropriate non-removable device.

The serial bus hub may be included as a component within various devices or may be a stand alone serial bus hub, as desired. In various embodiments, the serial bus hub may be included in a docking station (e.g., for a laptop), a printer, a display, etc. The serial bus hub 100 may include one or more ports for coupling to various devices, e.g., various serial bus devices, such as USB devices and/or the host system 150. Thus, the serial bus hub 100 may be powered passively by the host system 150 (although it may be possible that the serial bus hub 100 receive alternate or additional power from another source).

Various serial bus devices may be coupled to the serial bus hub 100. For example, the serial bus device could be a cell phone, a personal music player (e.g., an mp3 player, and/or an IPOD™, among other players, a CD player, etc.), a personal video player (e.g., a digital video player, a DVD player, etc.), a peripheral or input device (e.g., a printer, a game controller, touchpad, mouse, and/or keyboard, among others), or any other type of serial device.

Note that the above descriptions of the host system 150 and the serial bus hub 100 (and components therein, e.g., input devices) are exemplary only and other components and systems are envisioned.

Figure 2:
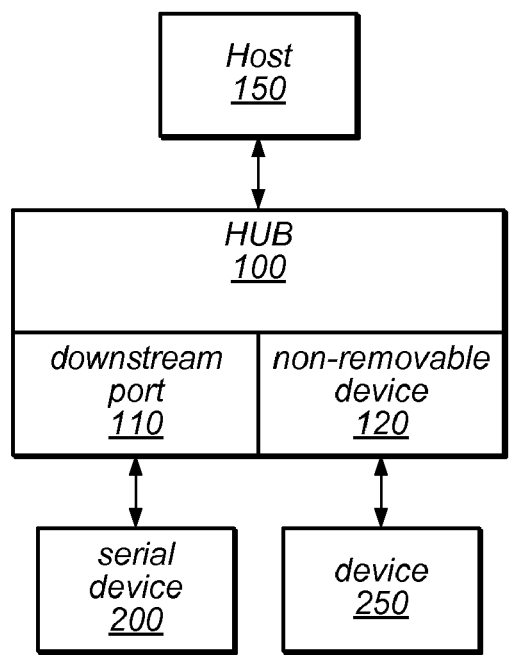
FIG. 2 is a block diagram of an exemplary serial bus hub which includes a non-removable function according to an embodiment of the present invention.
Figure 3:
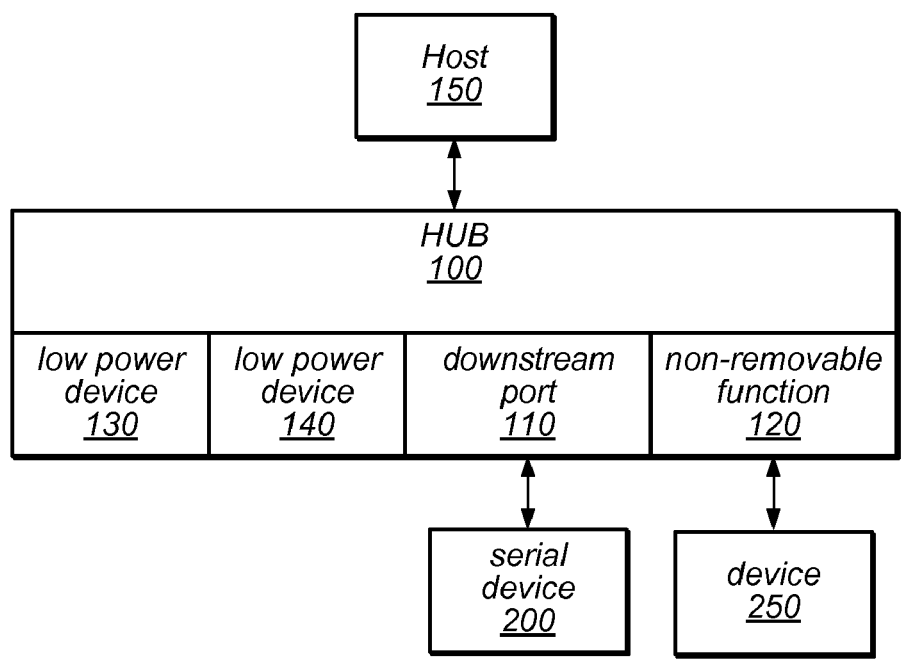
FIG. 3 is a block diagram of an exemplary serial bus hub which includes one or more low power devices according to one embodiment.

FIGS. 2 and 3—Exemplary Block Diagrams of the Serial Bus Hub

FIGS. 2 and 3 are exemplary block diagrams of the serial bus hub 100. As shown in FIG. 2, the serial bus hub 100 may be coupled to the host system 150. The serial bus hub may include at least one downstream port 110 (e.g., a USB port) which may couple to a serial device 200 (e.g., a USB device). Note that while FIGS. 2 and 3 illustrate a single downstream port, a plurality of downstream ports are envisioned. The serial bus hub 100 may also include non-removable device 120 which may couple to device 250. As indicated above, the non-removable device 120 may be any of a variety of devices, such as a network communication controller (e.g., an Ethernet controller), which may couple to a network device (e.g., the device 250, which could be an Ethernet device). Where the non-removable device 120 is a network communication controller, the serial bus hub may include a network port coupled to the network communication controller and the network port may be configured to couple to a network. Similar to above, there may be more than one non-removable device according to some embodiments.

As shown in FIG. 3, the serial bus hub 100 may further include one or more low power devices (130 and 140). The low power devices 130 and 140 may have limited or no functionality. In some embodiments, the low power devices 130 and 140 may have no functionality outside of the serial bus hub 100. Said another way, the low power devices 130 and 140 may provide no functionality to systems or devices external to the serial bus hub 100. For example, the low power devices may have no functionality other than the ability to enumerate as devices with the host 150. The low power devices may not be able to couple to (i.e., may not have a port on the serial bus hub 100) any external devices. In some embodiments, the low power devices may only respond to the host when interrogated and may only have a control endpoint.

In some embodiments, the low power devices may not physically exist (e.g., they could be "virtual" devices that appear to exist to host software entities, but do not actually exist physically in hardware or software), thereby reducing implementation cost and electrical power consumption. The serial bus hub may include logic (e.g., circuitry or program instructions in a memory medium) which is configured to enumerate the virtual low power devices with the host system. Thus, the low power devices may be physically present in the serial bus hub or may be virtual devices, as desired.

The low power devices 130 and 140 may allow the serial bus hub to receive or draw additional power from the host system 150. For example, each low power device may allow the serial bus hub to draw an additional 100 mA of power. Because the low power devices have limited or no functionality, this additional power may be provided to other devices of (or coupled to) the serial bus hub 100. For example, the additional drawn power (due to the low power device(s)) may be directed towards the non-removable device 120. More specifically, in some embodiments, at least a substantial portion of the additional power provided from the host 150 (due to the presence of the low power devices) may be usable for other devices of the serial bus hub 100 (e.g., non-removable device 120, the serial device 200, and/or other devices). As used herein "at least a substantial portion of the additional power" may refer to 95%-100% of the power provided based on the low power devices. For example, the presence of low power device 130 may allow an additional 100 mA to be drawn by the serial bus hub 100. The low-power device may consume less than 1 mA to operate (e.g., enumerate and/or remain responsive to the host 150), and the remaining portion of the power (>99 mA) may be provided to other devices (e.g., the non-removable device 120). In alternate embodiments, "at least a substantial portion of the additional power" may refer to 90%, 80%, or 75% (among other possible similar percentages) of the power.

In some embodiments, the number of the one or more low power devices may be based on the amount of power required by the non-removable device 120. For example, if the non-removable device 120 requires 250 mA to operate, two low power devices may be included into the hub to be able to draw enough power for the non-removable device (100 mA allotted for the non-removable device and 100 mA each for the low power devices, summing to 300 mA). Thus, in one embodiment, one or more non-removable devices may draw at least a portion of the additional power provided from the host system based on the presence (e.g., the enumeration of) the low power devices.

To further illustrate this example, the following table indicates the actual power draw and the reported power draw (to the host system 150):

| Device | Actual Power Draw | Reported Power Draw |
|---|---|---|
| Non-Removable Device 120 | 250 mA | 0 mA |
| Downstream Port 110 | 100 mA | 100 mA |
| Low Power Device 130 | ~0 mA | 0 mA |
| Low Power Device 140 | ~0 mA | 0 mA |
| Serial Bus Hub 100 | 100 mA | 400 mA |

Thus, in this example, the hub may report 400 mA in its configuration descriptor while the downstream port 110/device 200 reports 100 mA. The non-removable device 120 and low power devices 130 and 140 may report themselves as bus powered with a current draw of 0 mA.

In this case, the power reported by the hub is the sum of the power allocations permitted by the host 150 (e.g., according to USB specification): 100 mA for each of the hub controller, the low power device 130, the low power device 140, and the non-removable device 120. The actual power draw (as indicated in the table above) is 450 mA while the reported power draw is 500 mA, which may be specification compliant (e.g., USB specification compliant). Thus, in one embodiment, the number of low power devices may be dependent on the number of non-removable devices and their actual power draw.

In alternate embodiments, the number of the one or more low power devices may be determined based on the maximum amount of drawable power. For example, where the maximum amount of power drawn by the serial bus hub is 500 mA (e.g., as specified in the USB specification), the serial bus hub may include enough low power devices to draw the maximum amount. As one example, the serial bus hub 100 may include a serial bus hub controller (which may be allotted 100 mA by the host 150), the non-removable device 120 (which may be allotted 100 mA by the host 150), and the downstream port 110 (which may be allotted 100 mA by the host 150 when a device is coupled or enumerated). Thus, to achieve the total draw of 500 mA, at least two more low power devices may be included in the serial bus hub (each allotted 100 mA by the host 150).

In some embodiments, the low power devices may be selectively activated when additional power is required. For example, the serial bus hub 100 may include a plurality of low power devices and may enumerate with the host 150 as more power is required. As a specific example, the serial bus hub 100 may only require 100 mA at a first time to operate, but later (e.g., when the non-removable device 120 is turned on or otherwise used) additional power may be required (e.g., 250 mA). Accordingly, one or more of the low power devices may be activated or enumerated so that the additional power can be drawn and provided to the serial bus hub (e.g., for the non-removable device 120).

By using the low power device(s), the serial bus hub may be in compliance of a standard (e.g., by not drawing more power than is allowed for just the hub 100, the non-removable device 120, and/or the serial device 200). These power requirements may be specified by a serial bus hub specification, e.g., the USB specification (e.g., USB specification 2.0). In some embodiments, the serial bus hub 100 may only be allowed to draw up to 500 mA total (e.g., regardless of the number of devices included in or coupled to the serial bus hub 100). Such embodiments may be particularly useful where the non-removable device 120 requires more than 100 mA to operate (as is typically the case for an Ethernet controller).

Figure 4:
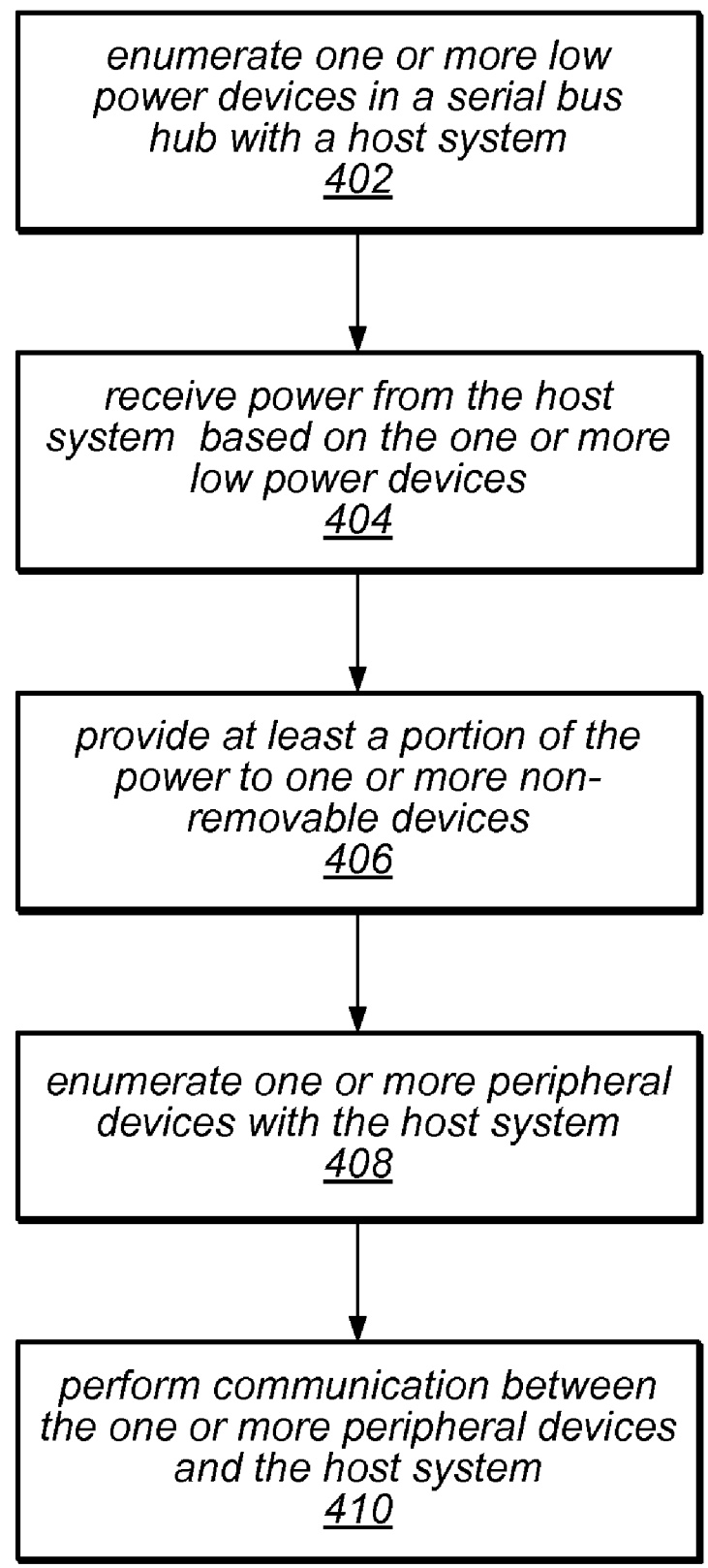
FIG. 4 is a flowchart diagram illustrating one embodiment of a method for enumerating one or more low power devices in a serial bus hub, according to one embodiment.

FIG. 4—Enumerating Low Power Devices in a Serial Bus Hub

FIG. 4 illustrates a method for enumerating low power devices in a serial bus hub. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, one or more low power devices may be enumerated (or otherwise identified with a host system). The one or more low power devices may be included in a serial bus hub (e.g., the serial bus hub 100 described above) and may be enumerated with respect to a host system (e.g., the host system 150 described above). For example, the low power devices may enumerate with the host system according to the enumeration methods outlined in the USB specification (which is hereby incorporated by reference as though fully set forth herein). As indicated above, the low power devices may have limited functionality and may have no functionality external to the serial bus hub.

In 404, power may be received from the host system based on the presence or enumeration of the low power devices in 402. As indicated above, each low power device (e.g., each enumerate low power device) may allow the serial bus hub to draw an additional 100 mA (although other values are envisioned) up to a maximum amount of power (e.g., 500 mA for the whole serial bus hub, or 400 mA for all of the devices of the serial bus hub).

In 406, at least a portion (e.g., a substantial portion) of the power received in 404 may be provided to one or more non-removable devices (e.g., similar to the non-removable device 120 described above) of the serial bus hub 100.

In 408, one or more peripheral devices (e.g., device 200 described above) coupled to the serial bus hub may be enumerated with respect to the host system. In some embodiments, some of the additional power provided based on the low power devices may be provided to the one or more peripheral devices, e.g., if the peripheral devices require additional power. Thus, in some embodiments, the additional power may be split among the non-removable devices and/or the peripheral devices. In alternate embodiments, however, the substantial portion of the power received based on the low power devices may be provided only to the non-removable device(s).

In 410, communication between the peripheral devices and the host system may be performed. More specifically, communication between the peripheral devices and the host system may be conveyed by the serial bus hub. The communication may include various synching communications, transfers of data (e.g., audio data, contact data, personal data), firmware updates for the peripheral devices, etc. Similarly, communication between the non-removable device(s) and the host system may be performed.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A serial bus hub, comprising:
   an upstream port, wherein the upstream port is configured to couple to a host system;
   one or more downstream ports coupled to the upstream port, wherein the one or more downstream ports is each configured to couple to a peripheral device;
   one or more low power devices comprised in the serial bus hub and coupled to the upstream port, wherein the one or more low power devices have no functionality external to the serial bus hub, wherein the presence of the one or more low power devices allows the serial bus hub to draw additional power from the host system, and wherein a substantial portion of the additional power from the host system is usable by one or more peripheral devices coupled to the one or more downstream ports;
   wherein the serial bus hub is configured to allow the host system and the one or more peripheral devices coupled to the one or more downstream ports to communicate.

2. The serial bus hub of claim 1, wherein the serial bus hub is a Universal Serial Bus (USB) hub.

3. The serial bus hub of claim 1, further comprising:
   one or more non-removable devices coupled to the upstream port, wherein the one or more non-removable devices draw at least a portion of the additional power from the host system.

4. The serial bus hub of claim 3, wherein the number of the one or more low power devices is based on the power required by the one or more non removable devices.

5. The serial bus hub of claim 3, wherein the one or more non- removable devices comprise a network communication controller for communicating over a network.

6. The serial bus hub of claim 5, wherein the serial bus hub further comprises:
   a network port coupled to the network communication controller, wherein the network port is configured to couple to the network.

7. The serial bus hub of claim 1, wherein each of the one or more low power devices allows the serial bus hub to draw an additional 100 mA.

8. The serial bus hub of claim 1, wherein the serial bus hub is comprised in a docking station.

9. The serial bus hub of claim 1, wherein the serial bus hub is comprised in a printer.

10. The serial bus hub of claim 1, wherein the serial bus hub is a passive serial bus hub.

11. A method, comprising:
    enumerating one or more low power devices comprised in a serial bus hub with a host system, wherein the one or more low power devices have no functionality external to the serial bus hub, wherein the serial bus hub is coupled to the host system via an upstream port of the serial bus hub, wherein the enumeration of the one or more low power devices comprised in the serial bus hub allows the serial bus hub to draw additional power from the host system, and wherein a substantial portion of the additional power from the host system is usable by other devices;
    receiving power from the host system based on the one or more low power devices;
    providing at least a portion of the power to one or more non-removable devices in the serial bus hub instead of the one or more low power devices.

12. The method of claim 11, further comprising:
    enumerating one or more peripheral devices coupled to corresponding downstream ports of the serial bus hub with the host system; and
    performing communication between the one or more peripheral devices and the host system.

13. The method of claim 12, further comprising:
    providing a second portion of the power to the one or more peripheral devices.

14. The method of claim 11, wherein the serial bus hub comprises a Universal Serial Bus (USB) hub.

15. The method of claim 11, wherein the number of the one or more low power devices is based on the power required by the one or more non-removable devices.

16. The method of claim 11, wherein the one or more non-removable devices comprise a network communication controller for communicating over a network.

17. The method of claim 11, wherein enumeration of each of the one or more low power devices allows the serial bus hub to draw an additional 100 mA.

18. The method of claim 11, wherein the serial bus hub is comprised in a docking station.

19. The method of claim 11, wherein the serial bus hub is comprised in a printer.

20. The method of claim 11, wherein the serial bus hub is a passive serial bus hub.

21. The method of claim 11, wherein the low power devices are physical low power devices that are physically present in the serial bus hub.

22. The method of claim 11, wherein the low power devices comprise virtual low power devices.

23. A serial bus hub, comprising:
an upstream port, wherein the upstream port is configured to couple to a host system;
one or more downstream ports coupled to the upstream port, wherein the one or more downstream ports are each configured to couple to a peripheral device;
first logic, wherein the first logic is configured to enumerate one or more virtual low power devices, wherein the one or more virtual low power devices are not physically present in the serial bus hub, wherein the one or more virtual low power devices have no functionality external to the serial bus hub, wherein the enumeration of the virtual one or more low power devices allows the serial bus hub to draw additional power from the host system, and wherein a substantial portion of the additional power from the host system is usable by one or more peripheral devices coupled to the one or more downstream ports;
wherein the serial bus hub is configured to allow the host system and the one or more peripheral devices coupled to the one or more downstream ports to communicate.

* * * * *

UNITED STATES PATENT AND TRADEMARK OFFICE
CERTIFICATE OF CORRECTION

PATENT NO.         : 7,882,297 B2
APPLICATION NO.    : 12/389538
DATED              : February 1, 2011
INVENTOR(S)        : Sisto et al.

It is certified that error appears in the above-identified patent and that said Letters Patent is hereby corrected as shown below:

In the Claims:

Column 8, Claim 4,
Line 3, please delete "non removable devices" and substitute -- non-removable devices --.

Signed and Sealed this
Third Day of May, 2011

David J. Kappos
*Director of the United States Patent and Trademark Office*